Jan. 20, 1959 H. M. STIEGLITZ 2,870,240

BUS DUCTS

Filed Dec. 1, 1952 3 Sheets-Sheet 1

INVENTOR,
HENRY M. STIEGLITZ,

BY Bruninga and Sutherland,
ATTORNEYS.

Jan. 20, 1959

H. M. STIEGLITZ

BUS DUCTS 2,870,240

Filed Dec. 1, 1952

3 Sheets-Sheet 2

INVENTOR,
HENRY M. STIEGLITZ,
BY *Bruninga and Sutherland,*
ATTORNEYS.

BUS DUCTS

Filed Dec. 1, 1952

INVENTOR,
HENRY M. STIEGLITZ,
BY Bruninga and Sutherland,
ATTORNEYS.

United States Patent Office 2,870,240

Patented Jan. 20, 1959

2,870,240

BUS DUCTS

Henry M. Stieglitz, St. Louis, Mo., assignor to Frank Adam Electric Company, St. Louis, Mo., a corporation of Missouri Application December 1, 1952, Serial No. 323,429

1 Claim. (Cl. 174—88)

This invention relates to bus duct of the type wherein overheating of the bus bars presents a problem.

The maintenance of a reasonably low temperature in bus duct wherein the bus bars carry heavy current loads without interfering with the effectiveness of the enclosure or introducing difficulties into the connection and assembly of sections thereof has presented quite a problem. In one sense the more perfect the enclosure from the protective standpoint the more imperfect it is from the standpoint of permitting dissipation of heat from the enclosed bus bars. Those bus ducts wherein protection has heretofore been compromised for ventilation have involved tedium of assembly not encountered with unventilated structures. For example, the top and bottom panels of an eight or ten foot section of bus duct when made of expanded metal or all-over perforated sheet metal have a natural tendency for the panels to curl and warp. This not only introduces complexities into the initial manufacture of the bus duct sections, but also complicates the installation where such panels must be removed in order to gain access to the bus bars, but without taking the structure apart.

In some types of bus duct, the bus bars are arranged quite close together, and where the closely arranged adjacent bus bars carry current in opposite directions, their mutual inductance is partially neutralized with the result that their operating temperature is reduced. The extent of such neutralization of mutual inductance is limited, however, by the fact that space enough to accommodate the connecting devices (between endwise arranged sections) has to be left between them. Sundry arrangements of more or less complexity have been provided for reducing this space. This simplest expedient for the purpose has been to internally thread a hole in the innermost piece of bus bar and then pass a bolt through an unthreaded (usually oversize) aligned hole in an outer piece of bus bar. The bolt (whose head is on the exterior of the outer bus bar piece) is then threaded into the inner piece. This practice has resulted in extensive ruination of the internal threads, which, on occasion, goes undiscovered until the installation is made and tested. Regardless of when it is discovered, it is necessary to remove the damaged bar and replace it; and then run the same risk of ruining the replacement.

The object of the present invention is, therefore, to provide bus duct whose temperature characteristics are improved not only by a convenient ventilating arrangement but also by means of a connection which permits of close association of bus bars without the risk of ruining them when the connection to an adjacent section is made.

To the attainment of this objective, I provide bus bars having end portions offset from their central portions, so as to permit the bars to be brought into end-overlapped relation with their apertures in approximate registry. According to the invention, these ends are secured together by threaded connectors, the female element of which is so formed as to require very little space between the bars. In particular, the female element comprises an interiorly threaded sleeve of a length sufficient to provide adequate thread strength. The sleeve is received within the bus bar proper, and there is a thin overhanging head which is disposed against the face of the bar. This head is of a non-circular form, and may have an outline shaped to cooperate with a thin flat wrench, or it may be provided with opposed inwardly disposed lugs which lock within a non-circular or slotted opening in the bus bar. Being a discrete element, which is preferably formed of tougher material (brass) than that of the bus bar (copper or aluminum), the threads are less subject to ruination, but if ruined, only the connector and not the complete bus bar need be replaced.

The male element may be a conventional jam bolt, the enlarged stem part of which is brought into abutment with the end of the sleeve on the nut or female element. Also, a cupped spring washer may be used in connection with the bolt.

The invention also contemplates the provision of a perforated cover panel consisting of a plurality of all-over perforated short sections whose marginal portions are pressed out of the plane of the central portion so as to give the sections a slight bulge. When all-over perforated panel sections are so formed, I have found substantially all tendency to curl is eliminated, and panels of any desired lentgh may be built up from short sections about two to three feet long without difficulty in handling, assembly or installation of the bus duct.

Other features of the invention will be in part apparent from and in part pointed out in the following detail description taken in connection with the accompanying drawings, in which.

Figure 1:
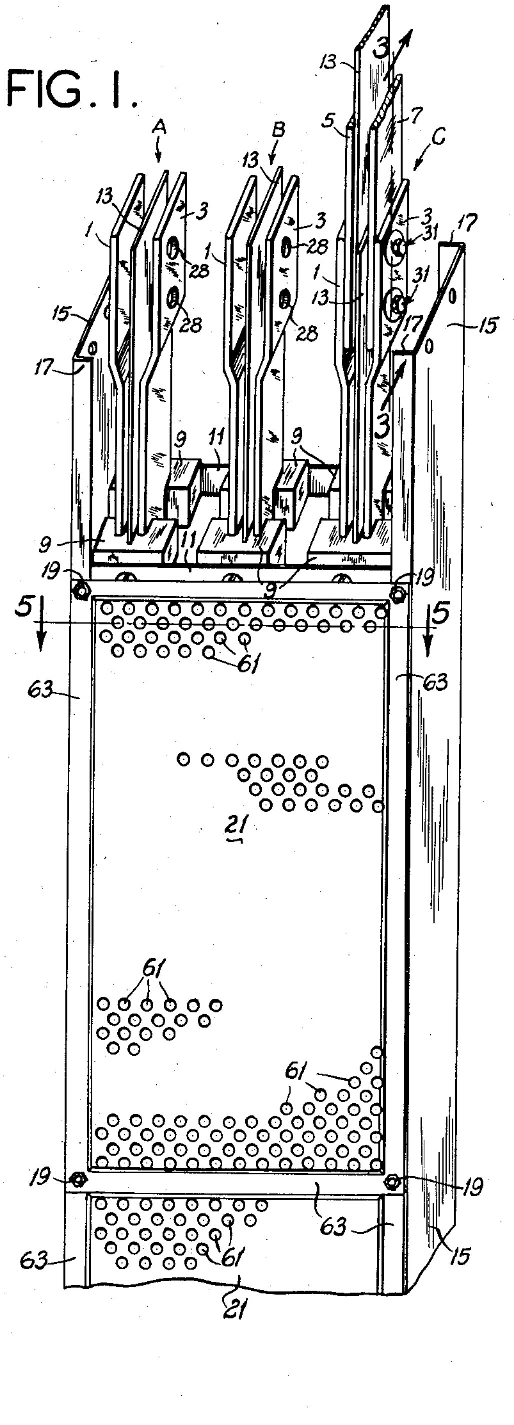
Fig. 1 is a perspective view of the endmost two or three feet of a section of bus duct embodying the invention.

It will be understood bus duct is customarily assembled from longitudinal sections, which may vary in length according to the manufacturer and the particular requirements for which it is designed. Referring to Fig. 1, there is shown a part of a bus duct wherein there are three sets of bus bars designated A, B and C. These three sets are laterally spaced from one another a relatively substantial distance, and each set is formed by two coextensive but relatively closely adjacent bars 1 and 3. On the right hand side of the view, additional bars 5 and 7 of the next section are shown connected with the bars 1 and 3, respectively, of set C. It will be understood that the next section is identical to that shown, but these details are omitted for purposes of clarity.

The bus bars are mounted upon insulator blocks 9, there being a set of blocks for each pair of bars. These blocks have inwardly facing slots, within which the bars are marginally seated. The blocks in turn interfit with transverse channel members 11, and also accommodate flexible strips 13 of insulation, which extend between the bars 1 and 3. The bus duct further comprises a pair of side-enclosure panels 15 spaced outwardly from the bars and provided with inturned flanges 17. The transverse members 11 are secured on the inner sides of these flanges 17 at intervals therealong, as by studs 19. The studs also form a means of attachment for top and bottom covers 21, to be further described.

Figure 3:
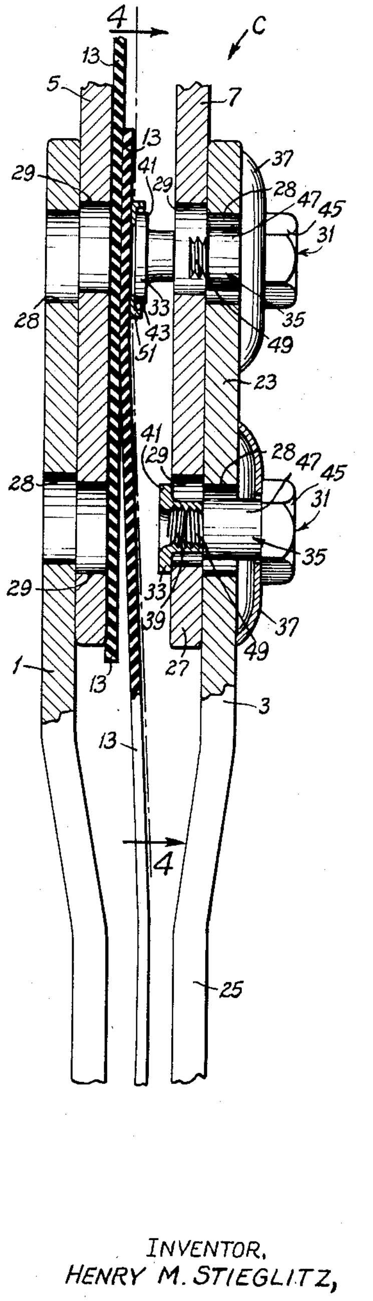
Fig. 3 is an enlarged longitudinal section taken on the line 3—3 of Fig. 1, showing the manner in which the connector of Fig. 2 is employed.

Referring now to Fig. 3, it will be seen the bus bar 3 has its end 23 offset outwardly from its central portion 25, so as to accommodate an end 27 of the aligned bus bar 7 from the next section.

The overlapped ends 23 and 27 are formed with elongate apertures 28 and 29, respectively, for receiving screw-type connectors generally designated 31. Each of these connectors comprises a female element 33, a male element 35 and a dished washer 37. The female element 33 has an interiorly-threaded sleeve 39 received within the aperture 29 and a thin overhanging flange 41 of a non-circular form. In the form shown in Fig. 2, the overhanging head 41 has a non-circular outline with a pair of flat sides 43 cooperable with a special wrench described hereinafter. For bus bars which are one-quarter of an inch thick, the female element may have a head 41 three-thirty seconds of an inch thick. The extending portion of the sleeve 39 is approximately the same length as the thickness of one of the bars.

The male element 35 is a jam bolt having a hexagonal head 45, a relatively thick stud portion 47 and a relatively small-diameter threaded extension, which threads into the sleeve 39 of the female element. The washer 32 is of a generally dished configuration and is applied against the outer bar under the head of the male element.

In the construction of the bus duct, the washer 37 and male element 35 are readily positioned on the outer overlapped part 23 of the bar 25, sufficient space between the sets A, B and C being provided for this purpose. The female element 33 is first seated in a thin socket-type wrench 51. This wrench is a thin bar, which is provided at one end with an opening 53 shaped to fit closely with the head 41 of the female element. Lugs 55 are upset from the inner margins of the opening 53, so that the element 33 is held thereby.

The ends of the flexible insulator strips 13 are positioned to one side (Fig. 3), and the screw element 33 is readily inserted by means of the wrench, between the strips and the bus bar 7. The element 33 is then pressed inwardly to enter its sleeve 39 in the opening 29, and both screw elements are tightened in the conventional manner. The sleeve portion 39 is thereby drawn into the aperture 29 up against the thick stud part 47 of the bolt so that only the thin head 41 projects from the inner surface of the bus bar 7. When so positioned, the insulator strips 13 may then be pushed over to the other side and fastening connections made for the bars 1 and 5 in a like manner.

It will be apparent that the spacing between the bars 1 and 3 may be relatively small, although the invention does not require tapped openings in the bus bars per se. The fastener elements can be made of relatively tough material, such as brass, and they provide a strong connection, which because of the washer 37 resists loosening during vibration, expansion and contraction of the bars. Also, the openings 28 and 29 in the bus bar may be of a size or shape to provide for some play in matching up the several bars, which otherwise might not register properly.

Figure 5:
Fig. 5 is a transverse section through the perforated cover of this invention, taken on the line 5—5 of Fig. 1.

In Figs. 1 and 5, there is shown an improved perforated cover panel section of this invention. This panel is substantially covered with perforations 61, leaving only small unperforated margins 63. Heretofore, when such a panel was formed from sheet metal in substantial lengths, the panel would exhibit a pronounced tendency to curl out of a flat plane, thereby presenting difficulty in handling during the construction of bus duct. I have found that this tendency to curl can readily be eliminated by forming the panel of a plurality of relatively short sections, each two or three feet long, with a slight bulge in its transverse direction. In stamping the perforations, the central part of the panel is offset out of the plane of the marginal portions 63 and the central portion itself may be given a slight curvature as indicated in Fig. 5. This simple operation introduces a considerable amount of stiffness, so that the panel retains a generally flat shape and can be readily manipulated on the job in constructing and assembling bus duct systems.

When necessary, the individual panel sections 21 may be removed by unscrewing the outer nuts on studs 19 which retain that particular section and without releasing the connection between flanges 17 and transverse channels 11. When desired, a further ventilating space may be provided between panel section 21 and the adjacent flanges 17 by the provision of washers or nuts therebetween on the studs 19.

Figure 2:
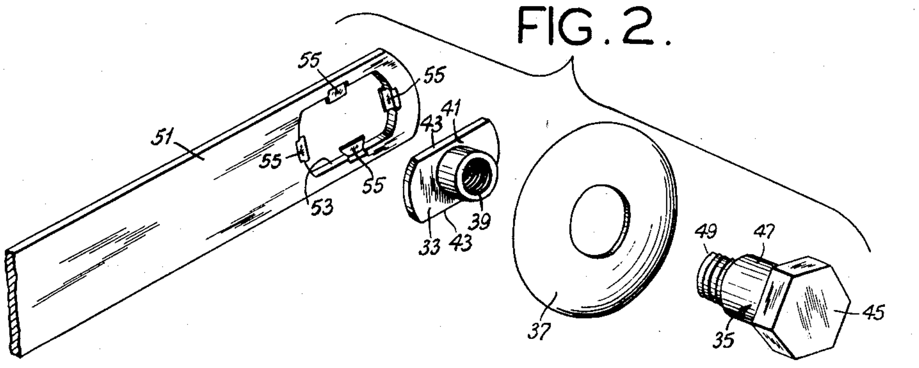
Fig. 2 is an exploded perspective view of a connector and wrench of this invention.
Figure 4:
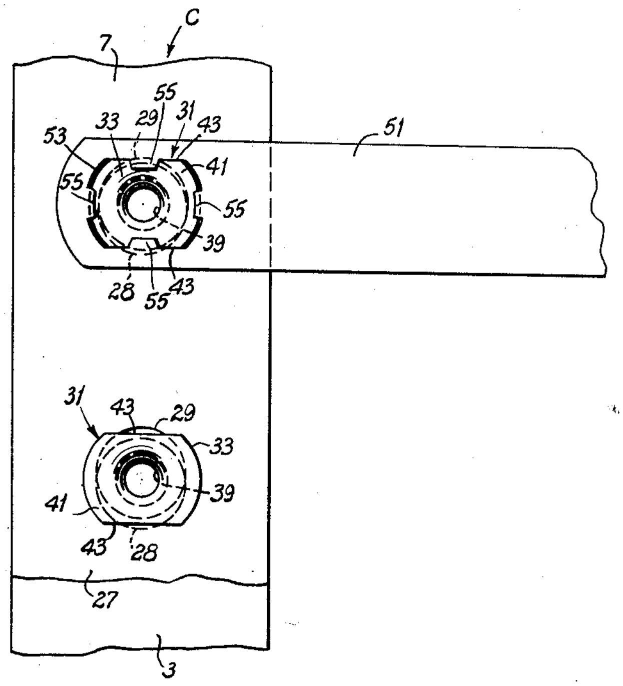
Fig. 4 is a side view taken on the line 4—4 of Fig. 3.
Figure 6:
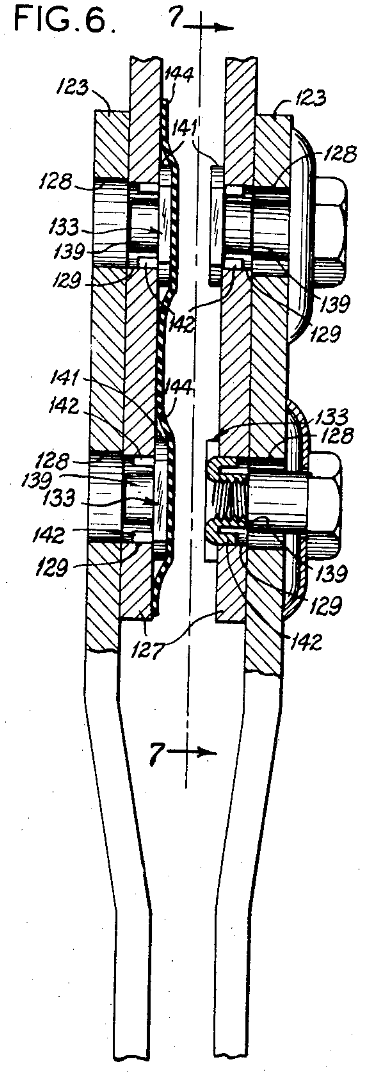
Fig. 6 is a view similar to that of Fig. 3 illustrating an alternative form of the female connector of this invention; and, Fig. 7 is a view taken on the line 7—7 of Fig. 6.
Figure 7:
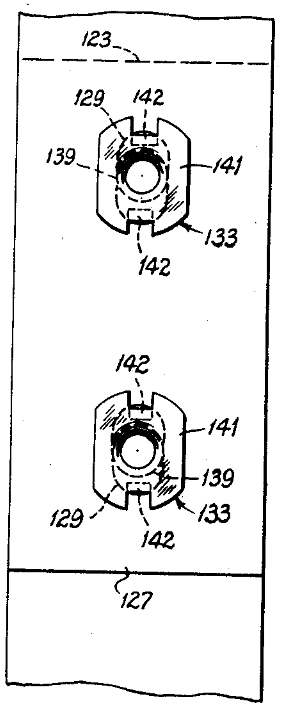

In Figs. 2–4, the female connector element is shown to be of a type that fits loosely within the bus bar openings at one end of a prefabricated section of bus duct. Hence, it is necessary to employ a flat wrench to restrain rotation of the element when two sections are connected together on the job. Figs. 6 and 7 disclose an alternative embodiment of the female element, which is of a character that simplifies the assembly of the sections. These female elements 133 are like those previously described in that each element has a sleeve 139 with interior thread and a thin overhanging head 141. In this instance, however, the non-circular form of the element comprises a pair of opposed lugs 142 struck out of the ends of the head 141 to extend beside the sleeve and seat against the end walls of an elongate opening 129 formed in the bus bar, which itself then serves as the holding wrench.

During the manufacture of a section of bus duct, the bus bars are die cut at one end with elongated openings 129 of a size correlated with the size of the female fasteners. In the case of bars having their ends offset, the elongated openings 129 are formed at the ends 127 which will be disposed inwardly during assembly of the sections. The other or outwardly disposed ends 123 of the bars, which receive the male fasteners, may have openings 128 of a different size and shape to provide for leeway in assembly. It is contemplated that prior to delivery of the sections, the elements 133 will be seated in the proper openings 128. The fit may be rather tight, but to insure against loss of the elements, a cover tape 144 may be temporarily adhered over the heads of the elements to the face of the bus bar. This cover tape may be removed at the job, and assembly is made in the usual manner, except that there is no need to use a wrench on the female elements. The lugs 142 restrain these elements against rotation. The insulation strips 13 shown in Figs. 1 and 3 are omitted in Fig. 6, but it will be understood they may be included in the final assembly.

From the foregoing description, it is apparent that the bus duct herein disclosed provides for cool-operating bus bars, yet facilitates the manufacture and assembly of prefabricated sections. The ventilated covers are more conveniently handled, and the connectors offer the advantages of tapped bus bars without their disadvantages. The separate connector elements are simple to manufacture, yet afford increased strength to resist thread stripping, they are readily replaceable should the threads be inadvertently stripped during assembly; and they are fully cooperable with jam bolts.

Although several embodiments of the invention are disclosed in detail, it is to be understood that the invention is not limited thereto, but the drawings and description are to be understood as being merely illustrative. It is appreciated that modifications and variations will present themselves to those skilled in the art without departing from the spirit of the invention or the scope thereof as set forth in the appended claim.

Having thus described the invention, what is claimed and desired to be secured by Letters Patent is:

In a run of bus bars which are fastened together at apertured overlapping end portions thereof; a fastener combination comprising a formed nut, jam bolt and resilient dished washer; the formed nut having a non-circular head accommodated outwardly of a bus bar and an interiorly threaded sleeve received within an aperture of a bus bar; said bolt having a non-circular head accommodated outwardly of a bus bar and a stud portion projecting from its head and at least in part received within an aperture of a bus bar, and a threaded portion; projecting from said stud portion and screwed within the sleeve of said nut; said dished washer having a predetermined thickness in its collapsed and unstressed conditions; said bus bars being of predetermined thickness; said sleeve portion of the nut and stud portion of the bolt having a predetermined combined length greater than the combined thickness of bus bars and dished washer in its collapsed condition but less than the combined thickness of the bus bars and dished washer in its unstressed condition, the bolt and nut being threaded together so that the stud of the bolt axially engages the sleeve of the nut, thereby to produce a predetermined stress in the washer without collapse of the washer, and the aperture of at least one bus bar being larger than the diameter of that part of the fastener received therein, thereby to permit a relative movement between a pair of fastened bars while the washer maintains pressure at their overlapping faces.

References Cited in the file of this patent

UNITED STATES PATENTS

| | | |
|---|---|---|
| 122,141 | Verree | Dec. 26, 1871 |
| 860,393 | Lees | July 16, 1907 |
| 1,204,691 | Sachs | Nov. 14, 1916 |
| 1,873,869 | Carr | Aug. 23, 1932 |
| 2,043,796 | Frank | June 9, 1936 |
| 2,110,743 | Shoemaker | Mar. 8, 1938 |
| 2,161,492 | Wadsworth | June 6, 1939 |
| 2,318,859 | Huguelet | May 11, 1943 |
| 2,350,601 | Frank et al. | June 6, 1944 |
| 2,407,142 | Cole et al. | Sept. 3, 1946 |
| 2,489,870 | Dzus | Nov. 29, 1949 |

FOREIGN PATENTS

| | | |
|---|---|---|
| 140,235 | Germany | May 6, 1903 |